United States Patent [19]

Bilhorn

[11] 4,158,085
[45] Jun. 12, 1979

[54] ELECTRODE WITH SEPARATOR BEADS EMBEDDED THEREIN

[75] Inventor: John M. Bilhorn, Mystic, Conn.

[73] Assignee: Yardney Electric Corporation, Pawcatuck, Conn.

[21] Appl. No.: 873,801

[22] Filed: Jan. 31, 1978

[51] Int. Cl.² ............................................. H01M 2/18
[52] U.S. Cl. .................... 429/130; 428/406; 350/107
[58] Field of Search .............. 429/119, 130; 428/325, 428/403, 406; 350/104, 107, 108

[56] References Cited

U.S. PATENT DOCUMENTS

| | | | |
|---|---|---|---|
| 1,626,508 | 4/1927 | Carlson | 428/406 |
| 2,988,587 | 6/1961 | Haring | 429/130 |
| 3,156,586 | 11/1964 | Solomon et al. | 429/130 |
| 3,279,316 | 10/1966 | Penton et al. | 428/406 |
| 3,285,782 | 11/1966 | Carson et al. | 429/119 |
| 3,573,954 | 4/1971 | Yamamoto | 350/107 |

Primary Examiner—Donald L. Walton
Attorney, Agent, or Firm—Donald E. Nist

[57] ABSTRACT

The method of the present invention comprises coating the surface of particles, such as glass beads, with a first coating, placing the coated particles in spaced relationship within a die so as to expose a portion of that coating, contacting that exposed portion with a second coating of material which forms an adhesive, and pressing the particles while still in the die against an electrode surface for a time and at a pressure sufficient to deform that surface and to bond the particles to that surface by the second coating without crushing the particles. The particles may be imbedded up to about 35% of their average diameter. The second coating is applied by a kiss coating technique utilizing a roller or the like. The electrode is thus provided with strongly adherent, discrete spaced particles which act as a separator to space the electrode from another electrode or the like. The method is simple, inexpensive, rapid and efficient. The coating materials can be selected so as to be highly resistant to chemical and other forms of degradation in use.

8 Claims, 7 Drawing Figures

ELECTRODE WITH SEPARATOR BEADS EMBEDDED THEREIN

BACKGROUND OF THE INVENTION

1. Field of the Invention

The present invention generally relates to separators for electrochemical cells and batteries and more particularly to electrodes which have separators incorporated therein.

2. Prior Art

Certain types of batteries require substantial circulation or irrigation of the electrolyte and in such instances the electrodes must be exposed to the electrolyte while still maintaining their relative positions within the battery. Electrodes have therefore been proposed which have separator particles imbedded in their surfaces but protruding therefrom a sufficient distance to maintain the separation of the electrode from another electrode of opposite polarity. The embedment procedure usually involves having to etch beads of electrically insulative material to cause them to have sufficient mechanical hold to the material lining the cavities in the electrode surface, which cavities have been provided during the embedment. It has been found that such embedment must be to the depth of at least 50% of the bead diameter in order to securely lock the beads in place. In order to assure such deep embedment, the electrode surface must be selected so that it is sufficiently malleable to permit considerable cold flow of material up around the bead without having to apply sufficient embedding force to crush the bead. A second conventional procedure for integrating separator pieces with the surfaces of an electrode involves punching out the separator pieces from a sheet and in the same operation causing them to adhere to the surface of the electrode plate. The equipment needed for such an operation is relatively complicated and sophisticated. Moreover, there are severe limitations on the materials which can be used for separators under such circumstances.

It would be desirable to be able to provide an improved method of integrating separator particles with an electrode surface so as to more rapidly and easily provide the electrode with an integral separator and without previously encountered limitations on the nature of the separator particles and on the nature of the electrode surface. Such method should preferably be inexpensive, utilize conventional materials and provide a durable product.

SUMMARY OF THE INVENTION

The improved method of the present invention satisfies the foregoing needs. The method is substantially as set forth in the Abstract above. Thus, the method involves coating particles with a first coating, placing the particles in spaced relationship in a die so as to expose a portion of the first coating, then contacting the exposed portion of the first coating in the die, as by kiss coating with a roller or the like, with a second coating of an adhesive-forming material, and then pressing the particles while still in the die against a deformable electrode surface for a time and at a pressure sufficient to deform that surface, embed the particles in and bond the particles to the deformed surface by the second coating without crushing the particles. The embedment can be up to about 35 percent of the diameter of the particles.

The first coating and second coating may be components of and together form an adhesive. Alternatively, the first coating may act to decrease the curing time for the second coating which may be an adhesive. Such materials may be, for example, anaerobic. Preferably, the particles are substantially spherical and are vitreous, such as glass or ceramic material such as silica, alumina, beryllia or zirconia. The die in which the glass or other electrically insulative beads are disposed preferably holds them in place by vacuum. The beads strongly adhere to the electrode surface by means of the embedment plus the action of the second coating. The second coating becomes set, as by curing it, whereupon the vacuum is released on the die and the die is removed, leaving the beads in place to form the desired separator integral with the electrode. The electrode surface may be any suitable surface, for example, silver, aluminum or the like and may be relatively hard, in contrast to the requirements of prior art embedding processes. Thus, the embedment procedure may reduce the thickness of the second coating substantially for better adhesion, without substantially densifying the electrode. Densifying could impair subsequent charging efficiency of the electrode. Further features of the present invention are set forth in the following detailed description and the accompanying drawings.

DRAWINGS

FIGS. 1 through 6 are a schematic representation of the various stages of treatment of one of a plurality of beads during processing by the present method to cause the bead to adhere to an electrode plate in the formation of the improved electrode of the invention; and, FIG. 7 is a schematic fragmentary top plan view, partly broken away, of a preferred embodiment of the improved electrode of the present invention.

DETAILED DESCRIPTION

FIGS. 1 through 6

Figure 1:
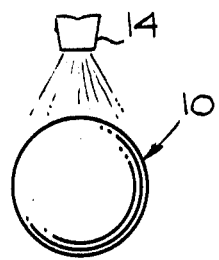
Figure 2:
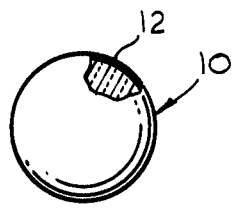

Now referring more particularly to FIGS. 1 through 6 of the accompanying drawings, a schematic representation is set forth therein of the various stages of treatment of one of a plurality of beads by the present method to cause the bead to adhere to the surface of an electrode plate in the formation of the improved electrode of the present invention, which electrode includes an integral separator. Thus, a bead 10 of glass or other vitreous material such as a ceramic, for example, alumina, beryllia, silica, zirconia or the like and of approximately spherical configuration (although other shapes can be used) is covered by a first coating 12, as by dipping or by spraying from a spray unit 14 (FIG. 1). The first coating 12 may be of any suitable material which will facilitate the application and use of a second outer coating on bead 10 for adhesive purposes. Thus, coating 12 can be, for example, a primer coat of a material which controls, that is, speeds up or slows down the cure time for the second coating, the second coating being an adhesive applied thereover in a subsequent step. For example, the primer may be one which is sold under the U.S. trademarks LOCQUIK N or LOCQUIK T by Loctite Corporation of Newington, Conn. and which generally comprises a proprietary blend of solvent degreaser and catalyst. Such a primer is used, for example, in connection with anaerobic adhesives sold under the U.S. registered trademark LOCTITE by Loctite Corporation.

Loctite anaerobic adhesives are polymers which remain liquid when exposed to air but would automatically harden without heat or catalysts when closely confined, as between two surfaces. Typical examples of particular anaerobic polymers are sold by Loctite Corporation under the U.S. trademarks LOCTITE AA and LOCTITE 601. Properties of these adhesives and the above-mentioned primers are set forth in the following Table:

TABLE

| Material | Chemical Composition | Viscosity(cps) (Canon-Fenske Viscometer) | Specific Gravity (g/cc.) |
|---|---|---|---|
| LOCQUIK N | copper salts in tri-chlorethane | 1-5 | 1.42 |
| LOCQUIK T | mercaptans in tri-chlorethane | 1-5 | 1.33 |
| LOCTITE AA | polyester acrylate catalyzed with <10% hydroperoxide | 10-25 | 1.08 |
| LOCTITE 601 | dimethylacrylate catalyzed with <10% hydroperoxide | 100-125 | 1.10 |

Alternatively, coating 12 can be the first of a two-component coating system necessary to form a satisfactory adhesive. For example, it can comprise an epoxy resin, such as the reaction product of epichlorohydrin and bisphenol A, which will set only on the application of a second coating in the form of a catalyst or accelerator or the like, for example, diethylene triamine, or methyl tetrahydrophthalic anhydride or the like. Similarly, acrylic resins which are polymers of acrylic acid or esters of that or similar acids, can be used as coating 22 and the first coating 12 can be a catalyst such as benzoyl peroxide or the like. Other suitable materials which can be used for coating 22 may comprise adhesives of the cyano-acrylate group, one example of which is methyl 2-cyano-acrylate. These adhesives usually contain inhibitors to prevent premature polymerization. In such circumstances the first coating 12 can be, for example, a chlorinated hydrocarbon degreaser such as trichlorethane, plus a conventional surface activator or a silane coupling agent to promote adhesion and having the general formula $(R'0)_3 Si (CH_2CH_2CH_2)_xR$ where R is an organic functional group, $R'0$ is a hydrolyzable alkoxy group and $x=0$ or 1.

Figure 3:
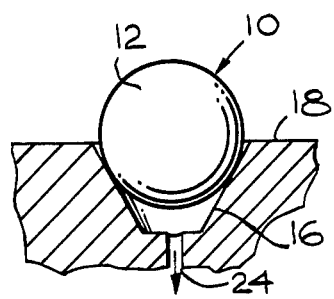

After coating 12 has been applied to a major proportion or substantially the entire surface of bead 10 and is more or less set in place (FIGS. 1 and 2), bead 10 is then placed in one cavity 16 of a die 18 containing a plurality of such cavitites. Cavity 16 is dimensioned relative to bead 10 so that a substantial proportion of coating 12 is exposed above die 18 and cavity 16, as shown in FIG. 3. Each cavity 16 is supplied with a separate bead 10 bearing coating 12 and cavities 16 are spaced out into the desired pattern with which the separator to be formed therefrom is to be provided.

Figure 4:
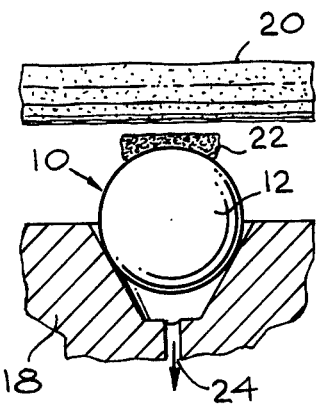

The next step is shown in FIG. 4, wherein a roller 20 of any desired configuration and containing a mass of a second coating material is used to kiss coat the uppermost portion of the coating 12 which is exposed above die 18. Thus, a second coating 22 is provided, which extends over an area which is less than that of coating 12. The thickness of coating 12 is exaggerated for purposes of illustration in FIGS. 4, 5 and 6. Bead 10 is retained in die 18 during this procedure by vacuum drawn through a bottom hole 24 in die 18, as shown in FIGS. 3, 4 and 5.

While bead 10, now bearing coating 22 on its uppermost portion, is still in die 18, it is pressed against surface 26 of an electrode 28 with a force sufficient to deform surface 26 to provide a cavity 30 therein. Cavity 30 may ultimately enclose up to about 30 or 35 percent of the total diameter of bead 10. Electrode 28 may include surface 26 of any suitable material, for example, green silver or aluminum or the like, preferably hard enough so as not to deform too easily and so as to resist densification during the embedding step shown in FIG. 5.

Throughout the step of embedding, die 18 is used to support bead 10 and urge bead 10 into surface 26 to form cavity 30 therein. As an example, when a sheet of green silver is utilized as surface 26 of electrode 28, it typically has a hardness of about 2.5 mohs. When bead 10 is of glass of a hardness, for example, of about 6.0 mohs, and has an average diameter of about 0.034 inches, it will require approximately 25 pounds force to embed bead 10 to a depth of approximately 20 percent of the diameter of bead 10 in surface 26. This force is well below the force necessary to crush glass bead 10. As a second example, when surface 26 comprises aluminum having a hardness of about 2.9 mohs, and when bead 10 if of glass having a hardness of about 6.0 mohs and a diameter of about 0.034 inches, a force necessary to embed that bead to a depth of approximately ⅓ of its diameter is about 35-40 pounds, again well below the force necessary to crush bead 10.

Figure 5:
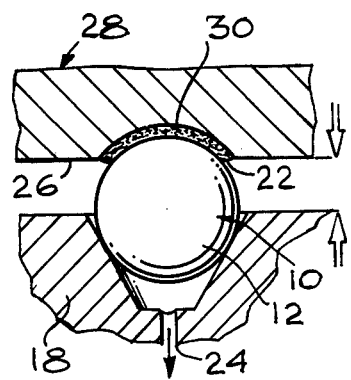

It will be noted that during the embedding step which is shown in FIG. 5, coating 22 is substantially thinned, and coating 22 is firmly sealed between the wall defining cavity 30 and first coating 12 on the surface of bead 10. Thus, the portion of coating 22 which bonds bead 10 in cavity 30 is out of contact with the atmosphere and is relatively thin. Adhesives can be selected for coating 22 which perform most satisfactorily when their bond line is thin when they are sealed from the atmosphere. Anaerobic adhesives as previously described are particularly useful for these purposes.

Figure 6:
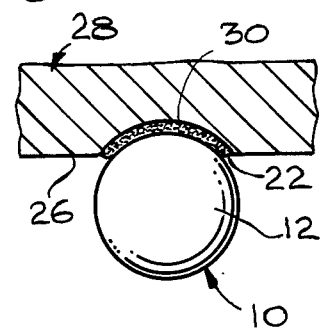
Figure 7:
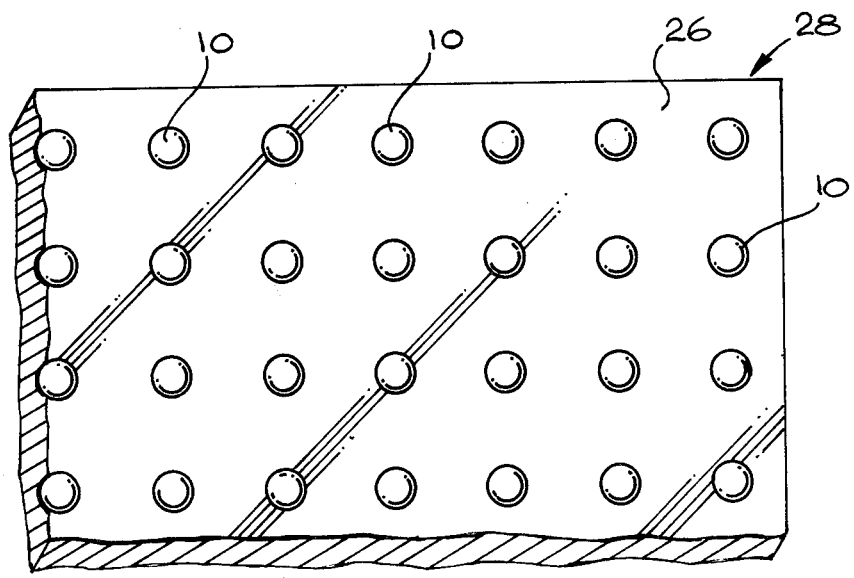

Once coating 22 has set to a thin stable form between the wall of cavity 30 and coating 12, bead 10 is firmly in place and will not detach from cavity 30 in surface 26 without great difficulty. The vacuum drawn on cavity 16 of die 18 through opening 24 can now be relieved so as to allow die 18 to be removed from against bead 10. The finished product, that is, the improved electrode of the present invention, with bead 10 separately and firmly held in place within cavity 30 is shown in FIG. 6.

FIG. 7

A plurality of beads 10 may be simultaneously coated with coating 12, racked into die 18 (each held in its own cavity 16 by suction or vacuum) then coated to provide coating 22 on the upper surface thereof, and then simultaneously embedded in and bonded to surface 26 of electrode 28 in a desired pattern and spacing. The plurality of beads 10 thus secured in surface 26 of electrode 28 collectively form a separator which mechanically prevents another electrode surface from contacting surface 26 but which permits free and easy access of electrolytes to surface 26. By careful selection of the proper adhesives for coating 22 and coating 12, the bond between beads 10 and the cavities 30 in which they are disposed can be made sufficiently strong so that they resist the chemical action of electrolytes and other forces which would otherwise tend to weaken and degrade them.

EXAMPLE I

A total number of 5568 barium crown glass beads having an average diameter of 0.034 inches and which resist crushing to a force of about 100 pounds each are racked into a steel die with one bead in each cavity of the die and the beads spaced approximately ⅛-inch apart in a uniform pattern. Each cavity of the die is dimensioned so that the bead placed therein extends above the level of the die approximately 50 percent of the diameter of the bead.

Before racking into the die, the beads are tumbled and sprayed with material which forms a first coating on the entire surface of each of the beads to an average thickness of about 0.0001 inches. The coating comprises LOCQUIK N, a primer, and is used for the following purposes: solvent degreasing and catalysis. The coating is allowed to set to a relatively stable non-tacky form on each bead before the bead is racked into the die. When so racked in the die, each bead is held in its die cavity by a vacuum applied through an opening in the bottom of the cavity.

A second coating is then placed over the uppermost exposed portion of the first coating of each bead while in the die by a kiss coating technique utilizing a roller. The second coating comprises LOCTITE 601, a structural adhesive in a thickness of about 0.0005 inches and is applied to all of the beads in the die over a period of about 1-3 seconds, whereupon the flat surface of a green silver electrode is placed into contact with that second coating on each of the beads and the die is urged toward the electrode with 75-ton force which is sufficient to embed each of the beads of the die to about 20 percent of the diameter of the bead into the surface of the electrode. This causes the second coating to thin in the contact area between the first coating and electrode to an average thickness of about a monomolecular layer. This contact is maintained under pressure for about 5-20 seconds until the thinned second coating firmly bonds each bead to the wall of the cavity formed in the electrode and receiving the bead. Thereafter, the die is removed from the beads by relieving the vacuum on each die cavity. The resulting product is an electrode containing at its surface a separator integral therewith and comprising a spaced plurality of beads which permit access of electrolyte to the electrode surface but which prevent contact of the surface by another electrode. The beads are found to stay firmly in place during extensive use of the electrode.

EXAMPLE II

The procedure of Example I is followed except that the beads comprise etched barium crown glass having an average diameter of 0.034 inches and are used in a total number of 5568.

Moreover, the electrode surface is aluminum, the force applied to embed the beads is 100 tons, the composition of the first coating is LOCQUIK-T, a primer, and that of the second coating is LOCTITE 601, a structural adhesive. The beads are spaced approximately ⅛-inch apart to form the integral separator when embedded and bonded to the electrode surface. The finished product has the advantages and characteristics of that of Example I.

Various modifications, changes, alterations and additions can be made in the improved electrode of the present invention, its components and parameters and in the improved method of the present invention, its steps and parameters. All such modifications, changes, alterations and additions as are within the scope of the appended claims form part of the present invention.

What is claimed is:

1. An improved electrode with integral electrode separator, said electrode having a hard metallic exposed surface bearing a plurality of discrete, spaced, electrically insulative embedded particles of sufficient diameter to separate said electrode surface from an adjacent electrode surface, said particles having a first coating adjacent to and over a major portion of the particle surface and a second coating on only a minor portion of the exterior of said first coating and contacting and adhering said particle to said electrode surface, the electrode surface otherwise being free of said coatings.

2. The improved electrode of claim 1 wherein said particles comprise about spherical beads.

3. The improved electrode of claim 2 wherein said beads are glass.

4. The improved electrode of claim 2 wherein said beads are ceramic.

5. The improved electrode of claim 2 wherein said beads are embedded in the surface of said electrode up to about 35% of the diameter of said beads.

6. The improved electrode of claim 1 wherein said first coating reduces the cure time for said second coating.

7. The improved electrode of claim 1 wherein said first coating and said second coating together comprise an adhesive.

8. The improved electrode of claim 1 wherein said coating is a primer, and said second coating is an adhesive.

* * * * *